US006905775B1

(12) United States Patent
Barlow et al.

(10) Patent No.: US 6,905,775 B1

(45) Date of Patent: Jun. 14, 2005

(54) COATED ALUMINIUM WORKPIECE

(75) Inventors: Eric Barlow, Banbury (GB); Mark Foster, Banbury (GB); Chris Pargeter, Banbury (GB); Peter Karl Ferdinand Limbach, Goettingen (DE)

(73) Assignee: Novelis Inc., Ontario (CA)

( * ) Notice: Subject to any disclaimer, the term of this patent is extended or adjusted under 35 U.S.C. 154(b) by 0 days.

(21) Appl. No.: 09/508,369

(22) PCT Filed: Oct. 13, 1998

(86) PCT No.: PCT/GB98/03091

§ 371 (c)(1),
(2), (4) Date: Jun. 14, 2000

(87) PCT Pub. No.: WO99/19086

PCT Pub. Date: Apr. 22, 1999

(30) Foreign Application Priority Data

Oct. 13, 1997 (GB) ............................................ 9721650

(51) Int. Cl.$^7$ .......................... B32B 15/04; C25D 11/04

(52) U.S. Cl. .................... 428/469; 428/472.2; 428/336; 428/699; 428/702; 205/172; 148/248

(58) Field of Search ................................ 428/469, 697, 428/699, 701, 702, 220, 472.2, 688, 689, 336

(56) References Cited

U.S. PATENT DOCUMENTS

| | | | | | |
|---|---|---|---|---|---|
| 3,935,349 | A | | 1/1976 | Terai et al. | |
| 4,138,526 | A | | 2/1979 | Børresen et al. | |
| 4,889,718 | A | | 12/1989 | Sugama | |
| 4,897,231 | A | | 1/1990 | Scheurer et al. | |
| 5,126,210 | A | * | 6/1992 | Wieserman et al. | 428/457 |
| 5,139,601 | A | | 8/1992 | Holmes-Farley et al. | |
| 5,238,715 | A | * | 8/1993 | Wefers et al. | 220/495.03 |
| 5,395,687 | A | * | 3/1995 | Totsuka et al. | 428/323 |
| 5,439,747 | A | | 8/1995 | Sturdevant et al. | |
| 5,846,646 | A | * | 12/1998 | Meppelink et al. | 160/166.1 |
| 6,177,189 | B1 | * | 1/2001 | Rawlings et al. | 428/343 |

FOREIGN PATENT DOCUMENTS

| | | |
|---|---|---|
| DE | 2705652 | 5/1978 |
| DE | 19548740 | 6/1997 |
| EP | 0426328 | 5/1991 |
| FR | 2252421 | 6/1975 |

OTHER PUBLICATIONS

Wernick et al., The Surface Treatment and Finishing of Aluminum and its Alloys, 5th. ed., vol. 1 (ASM International), pp. 220–221 and 296–297.

* cited by examiner

*Primary Examiner*—Jennifer McNeil
(74) *Attorney, Agent, or Firm*—Cooper & Dunham LLP

(57) ABSTRACT

Aluminium alloy sheet having on a surface anodic oxide film and an overlying coating consisting essentially of at least one adhesion promoter excluding silanes. Sheet for architectural use carries a paint layer over the adhesion promoter coating. Sheet for automobile use may carry an electroconductive paint primer layer over the adhesion promoter coating. Preferred adhesion promoters are polyacrylic acid and pretreatments containing Cr, Mn, Mo, Si, Ti, Zr and F values.

16 Claims, No Drawings

COATED ALUMINIUM WORKPIECE

There is a large market in painted aluminium sheet, both for architectural use and for automotive use. There is also a large market for lacquered aluminium sheet for canstock use. In all these applications, the adhesion of the organic coating (typically paint, lacquer or adhesive) to the aluminium metal may not be adequate. Various surface pretreatments have been proposed and are widely used to improve such adhesion:

An anodic oxide film is formed on the aluminium surface. Particularly when anodising is done in a phosphoric acid based electrolyte, the outer surface of the anodic oxide film may be extremely rough, including filaments or whiskers, such as to provide an excellent mechanical key for subsequently applied organic coatings.

Adhesion promoters are a class of materials that have been used to improve the adhesion of organic coatings to an underlying metal substrate. One example is polyacrylic acid. A chromium-fluoride-phosphate pretreatment has been successfully marketed under the tradename Accomet C. Other similar treatments contain fluoride values and other transition metals. Such pretreatments may act as adhesion promoters and also provide corrosion resistance.

Adhesion promoters have in general been applied to bare metal. This invention is based on the idea that additional advantages may be obtained if such adhesion promoters are applied to an aluminium metal surface which is not bare.

Thus the invention provides an aluminium workpiece having on a surface thereof an anodic oxide film and a coating which consists essentially of at least one adhesion promoter excluding silanes.

A workpiece is an object of indeterminate size and shape. While the invention may have application in connection with extrusions and other workpieces, it is of principal interest in connection with aluminium sheet, either continuous sheet in the form of coil, or cut sheet which is either flat or has been formed into shaped components e.g. for architectural or automotive or canstock use. Depending on the intended application, either one surface or both surfaces of the sheet may have the artificially applied aluminium oxide or hydroxide film and the coating.

The term aluminium is here used to include both the pure metal and alloys in which Al is a major component. Preferred are alloys of the 2000, 3000, 5000 and 6000 series of the Aluminum Association Inc Register.

Preferably the oxide film is an anodic oxide film, e.g. formed by anodising the metal workpiece in an acidic electrolyte. Preferred electrolytes are sulphuric acid, and particularly phosphorus oxyacids including phosphoric acid. Anodising conditions may be chosen, in accordance with criteria well known in the field, to generate an anodic oxide film having a rough outer surface. The artificially applied aluminium oxide or hydroxide film needs to be thick enough to provide abrasion and corrosion resistance; but not so thick as to have a tendency to spall or crack when a workpiece carrying the film is formed to shape; and, in a preferred aspect of the invention discussed below, not so thick as to make the coating so electrically resistant that spot-welding is impossible. Preferred thicknesses are in the range 10–200 nm particularly 15–150 nm, more especially 15–50 nm.

Adhesion promoters are known and employed to enhance adhesive bond strength, or more commonly to enhance the environmental resistance of the substrate surface/adhesive interface to attack by moisture. Adhesion promoters were described by P E Cassidy et al in Ind. Eng. Chem. Prod. Res. Development Volume 11, No 2 (1972) pages 170–7; and by A J Kinlock in J Mat Sci., 15(1980), pages 2141–66 at page 2159. Commercial pretreatments (adhesion promoters) include Alodine NR1453., Alodine NR2010, zirconia/polyacrylic acid, Accomet C and Safeguard 6000 which contain Ti, Zr, Cr, Mn, Si, F, polyacrylic acid and substituted styrenes.

An adhesion promoter may be a pretreatment comprising one or more of Cr, Mn, Mo, Si, Ti, Zr values. These values are preferably inorganic, in the sense that they do not contain metal-carbon (or Si—C) bonds, although they may be used in conjunction with organic polymers. The adhesion promoter may also comprise fluoride values or another acid value. They may conveniently be provided by dissolving fluorozirconic acid $H_2ZrF_6$, or a soluble fluorozirconate salt, in water; alternatively, a corresponding acid or salt of Cr, Mn, Mo, Si or Ti may be used. Cr is preferably absent on account of its toxicity and effluent problems. Flurozirconate (or other fluoro complex) is preferably present at a concentration of 0.1–200 g/l, particularly from 10–100 g/l, of a formulation for application to an aluminium workpiece.

In the case of Cr and Mn, there is probably some dissolution of an anodic oxide film and reduction by Al of the Cr or Mn from a higher to a lower oxidation state. In the case of formulations based on Ti or Zr there are no oxidation states to change. It is thought that the hydrofluoric acid may attack the anodic oxide film causing a local pH change resulting in the formation of a pretreatment/$Al_2O_3$ gel followed by further pretreatment deposition. These pretreatments may be applied in the form of no-rinse solutions.

These pretreatment formulations based on fluoride and transition metals may also contain an organic polymer such as polyacrylic acid or polyvinylpyrrolidone. Whether or not such polymer is present, the pretreatment coating is preferably provided at a coat weight of 2–500 mg/m$^2$, e.g. 5–100 mg/m$^2$, particularly 10–60 mg/m$^2$.

Other possible adhesion promoters include siloxanes, polyvinylphenols, polyacrylic acids and salts and esters thereof, and polyacrylic acid/zirconia mixtures. These adhesion promoters are preferably present at a coat weight of 5–500 mg/m$^2$ preferably 10–500 mg/m$^2$. While adhesion promoters are effective to improve surface properties of the aluminium workpieces of this invention, it is surprisingly found that lower concentrations are sometimes more effective than higher concentrations.

In another aspect the invention provides a method of treating an aluminium workpiece, which method comprises precleaning a surface of the workpiece, anodising the workpiece so as to form an anodic oxide film on the surface, applying to the anodic oxide film a coating of an adhesion promoter excluding silanes and preferably applying to the adhesion promoter coating an organic layer. Anodising may be effected in less than 60s e.g. less than 10s, and is preferably performed continuously. The adhesion promoter is preferably applied, either as a no-rinse coating, e.g. a composition consisting essentially of the adhesion promoter in a volatile vehicle which evaporates from the surface of the workpiece leaving a film of the adhesion promoter without the need for rinsing. Or a conversion coating composition may be used which reacts chemically with the substrate, e.g. the artificial oxide layer, to form a film of the adhesion promoter which is not removed by rinsing.

In one embodiment, a porous anodic oxide film is formed of thickness preferably 50–200 nm. When polyacrylic acid or other adhesion promoter is applied on top of the porous film, it generally fills the pores and forms a continuous layer on top of them. This embodiment has surprisingly good corrosion resistance and is particularly suitable as painted sheet for architectural use.

In another embodiment, a barrier layer anodic oxide film is formed of thickness preferably 20–50 nm. A pretreatment e.g. NR1453 (adhesive promoter) is applied over this; the anodic film is sometimes found to be thinner after application of the pretreatment but never disappears altogether. A paint film, e.g. a conductive paint primer may be applied over the pretreatment, which primer film may be thin so as to permit electro-welding. Sheet according to this embodiment may have surprisingly good forming characteristics and is particularly suitable for automotive use where components formed from the sheet are adhesively bonded to other components. Components formed from the sheet, and structures made by adhesively joining the components, can be painted on an electrophoretic or electrostatic paint line. Primed aluminium sheet is widely sold for automotive use, where the presence of the primer gives the sheet improved forming properties.

The aluminium sheet or other workpiece according to this invention carries on its surface a composite coating consisting of an anodic aluminium oxide film and a coating consisting of an adhesion promoter overlying the film or occupying pores adjacent the outer surface of the film. This composite coating is found to improve adhesion to the workpiece of an applied organic coating such as a paint, lacquer, varnish, enamel or adhesive. In another aspect, the invention provides such an aluminium workpiece where paint, lacquer, varnish, enamel or adhesive is present overlying the artificially applied aluminium oxide or hydroxide film and the adhesion promoter coating.

EXAMPLE 1

Sheets of AA6016, 1.2 mm thick, and AA5182, 1.15 mm thick, were electrolytically cleaned in 200 g/l phosphoric acid at 90° C. for 3 seconds at 3 kA/m$^2$. Half of the sheets were anodised in phosphoric acid to produce a film typically 15–50 nm thick. Treatment conditions were:

Phosphoric acid 200 g/l

Temp 65° C.

Time 0.5 secs

Spray rinse in 30–50 g/l phosphoric acid then deionised water

Dry 120° C. for 2 mins.

After rinsing and drying, the bare and anodised sheets were coated with a Ti containing no-rinse pretreatment Alodine NR 1453 to give a coating weight 5–15 mg/m$^2$ expressed as the weight of Ti. Alodine NR1453 contains F, Zr and Ti. and has in addition a polymer present (a poly (hydroxyphenyl) styrene derivative).

Comparison samples were prepared by applying a Cr containing no-rinse treatment, Accomet C, at conventional levels.

After drying the sheets were coated on one side with electro conducting epoxy based paint Bonazinc 2004, (containing Al pigment) or Bonazinc 2000 (containing Al/Zn pigments). Coating thickness was about 7±2 microns.

Formability Tests

Formability was measured by means of an Erichsen dome test BS 3855 arranged so that the paint film on the convex side of the dome was extended 20% in biaxial tension. This corresponds to a bulge height of 8 mm. The coating area deformed by the dome was cross hatched. The punch side of the sheet was lubricated. Adhesion in the domed area was measured by means of BS 3900 Part 2 test using a sticky tape. Scoring was as per the BS 3900 Part 2 test in which the best result is 0 and the worst is 5.

The results are presented in Table 1 from which it can be seen that:

1. In the absence of an anodised film the NR1453 was inferior to Accomet C. Performance generally improved as the coating weight decreased.
2. In the presence of an anodised film the NR1453 gave results comparable to or better than Accomet C.

Adhesive Bonding Tests

Sheets prepared as described above were adhesively bonded and tested in T-Peel. 25 mm wide strips were overlapped and adhesively bonded with an epoxy adhesive XD4600, the coated side being towards the adhesive. The overlapped joint was then peeled apart at a cross head movement rate of 20 mm/min.

On initial application of the peel load, the load rises to a peak and then drops to a constant level as the joints begins to separate. The constant load is measured and must exceed 7N/mm of width of joint and the failure mechanism be cohesive in the adhesive.

All of the NR 1453 equalled or exceeded 7N/mm when applied to pretreated anodic film, and all failed by cohesive failure within the adhesive.

TABLE 1

Automotive Primer Evaluation - Phase ll

| Alloy | Additional Treatment | Pretreatment | Erichsen (Gt) 8 mm Dome |
|---|---|---|---|
| AA 6016 | None | Alodine NR 1453 (≈5 mg/m$^2$) | 2 |
| | | Alodine NR 1453 (≈10 mg(m$^2$) | 4 |
| | | Alodine NR 1453 (≈15 mg/m$^2$) | 4 |
| | | Accomet C | 1 |
| | Anodised | Alodine NR 1453 (≈5 mg/m$^2$) | 1 |
| | | Alodine NR 1453 (≈10 mg/m$^2$) | 1 |
| | | Alodine NR 1453 (≈15 mg/m$^2$) | 2 |
| | | Accomet C | 2 |
| AA 5182 | None | Alodine NR 1453 (≈5 mg/m$^2$) | 2 |
| | | Alodine NR 1453 (≈10 mg/m$^2$) | 3 |
| | | Alodine NR 1453 (≈15 mg#m$^2$) | 5 |
| | | Accomet C | 2 |
| | Anodised | Alodine NR 1453 (≈5 mg/m$^2$) | 1 |
| | | Alodine NR 1453 (≈10 mg/m$^2$) | 0 |
| | | Alodine NR 1453 (≈15 mg/m$^2$) | 1 |
| | | Accomet C | 1 |

EXAMPLE 2

The conditions of Example 1 were reproduced using a production line comprising an electrolytic etch, anodising to form a barrier layer about 20 nm thick, to which the pretreatment was applied by roller coating at 60 m/min. Erichsen test bulges were made having a height of 8 mm. Results are summarised in Table 2.

On both alloys the presence of a barrier film under the pretreatment improved performance.

TABLE 2

Primer Applications - Summary of Erichsen Dome Test Adhesion Performance*

| Surface Cleaning | Pretreatment | Bonazinc 2000 AA6016 | Bonazinc 2000 AA5182 | Bonazinc 2004 AA6016 | Bonazinc 2004 AA5182 |
|---|---|---|---|---|---|
| Electrolytic etch | Alodine NR 1453 | 3 | 4 | 2 | 4 |
| ≈20 nm | None | 3 | 3 | 2 | 3 |
| barrier layer (anodised) | Alodine NR 1453 | 1 | 2 | 2 | 0 |

*BS 3900 Part 2 Erichsen Dome Height 8 mm

EXAMPLE 3

Samples of AA6016 T4 in the form of coils 1.2 mm thick were passed through an electrolytic cleaning and anodising section of a production line at a rate of 26 m/min. The line contained three baths each containing 200 g/l phosphoric acid with less than 5 g/l dissolved aluminium and operated under the following conditions.

| | Temp ° C. | | | Charge Density $kCm^{-2}$ | | |
|---|---|---|---|---|---|---|
| Clean only | 90 | 90 | 90 | 2 | 2 | 1 |
| Clean and anodise | 90 | 90 | 70 | 2 | 2 | 3.5 |

To the pretreated coils was applied an adhesion promoter Alodine NR1453 (Henkel, containing fluorotitanate, fluorozirconate and poly(hydroxyphenyl) styrene derivative) at a rate of about 10 $mg/m^2$.

To the resulting coils was applied a coating of an electroconducting epoxy-based paint primer Sonazinc 2004 (containing Al pigment) at a coating thickness of about 7 μm. Samples of primed sheet were subjected to formability tests and adhesive bonding tests as described in Example 1.

Samples that had been cleaned only gave an Erichsen dome test result of 2. Samples that had been cleaned and anodised gave an Erichsen dome test result of 0, a substantial improvement.

Samples that had been cleaned only and that had been cleaned and anodised were subjected to the T-peel test. All samples passed the test, for joint failure was in all cases in the adhesive rather than at any adhesive-metal interface.

This work was repeated with other pretreatments (adhesion promoters) as shown.

NR 2010 (Henkel, fluorotitanate) at about 5 $mg/m^2$.

NR 778 (Henkel, fluorozirconate) at about 10 $mg/m^2$.

Ammonium zirconium carbonate polyacrylic acid reaction product, at about 10 $mg/m^2$.

Accomet C (Albright & Wilson, Cr and Si values).

Safeguard 6000 (Sanchem, permanganate).

PT2 (Alcan, Si values).

The Erichsen dome results (not reported in detail) for the cleaned-and-anodised samples were all satisfactory (3 or less), and all equal to or better than the cleaned-only samples. In T-peel tests, substantially all failures were clearly within the adhesive layer, indicating that bonding was satisfactory.

EXAMPLE 4

Aluminium sheet intended for use as closure stock for cans was anodised in sulphuric acid on a commercial production line run at 90 m/min. Some of the anodised sheet was then treated with polyacrylic acid (MW 60000 PAA). Panels were then bar coated with two white polyester external enamels plus clear overprint varnishes using normal commercial practices. 60 mm deep drawn shells were produced from the lacquered panels lubricated with caster oil, again in accordance with normal commercial practice. The following lacquer adhesion tests were performed.

Feathering Test

At the closure base a small cup was extended round the shell circumference. The relative lacquer feathering characteristics for each experimental substrate were assessed by comparing with specimen standards, and ranked on a scale 0 to 4 with the highest value showing the worst coating adhesion.

Cross-Hatch Adhesion Loss

At the closure base where the coating had received the most deformation, grid lines were scored through the lacquer into the panel using a metal scribe. Lacquer adhesion was assessed by firm application of adhesive tape on to the grid lines, followed by quick removal and the film percentage adhesion loss estimated and performance ranked on a scale 0 to 4.

Adhesion After Autoclaving

Closures were immersed in water held at 120° C. for 30 mins in an autoclave, and the lacquer adhesion characteristics were assessed.

The results are set out in Table 3. It can there be seen that PAA improved the performance of the coating.

TABLE 3

Lacquer Adhesion Characteristics

| | Lacquer Performance | | | |
|---|---|---|---|---|
| Substrate Identification | Feathering Test | Cross-hatch Adhesion Loss | Adhesion after Autoclaving | Total Score |
| Without PAA | 0 | 1 | 0.5 | 1.5 |
| With PAA | 0 | 0 | 0 | 0 |

EXAMPLE 5

Two alloys were used in this work, AA3005 which was 0.4 mm thick, and AA5754 which was 0.95 mm thick. Panels of each alloy were precleaned by treatment with phosphoric acid for 3 seconds at 90° C. They were then anodised in phosphoric acid at 65° C. using a current of 3 A. In some cases the anodised surfaces were given further treatment with adhesion promoters:

Accomet C, a commercial no rinse treatment based on hexavalent chromium and containing fluoride and phosphate values;

1:1 by weight mixtures of zirconium oxide and polyacrylic acid;

Polyacrylic Acid alone.

The pretreated specimens were then painted and exposed to acid salt spray according to DIN 50021-ESS. Results set out in Table 4 below are expressed on a scale of 0 to 5 where 0 is excellent, 1 and 2 are acceptable, 3 is borderline and 4 and 5 are unacceptable. The alloy here was AA3005. Paint A was a single coat polyester. Paint B was a 2-coat polyester system.

TABLE 4

| | | | Hours exposed to acetic acid salt spray | | | |
|---|---|---|---|---|---|---|
| | | | Panel & Scribe | | Creep | |
| Paint | Anodised (secs) | Adhesion Promoter | 336 | 1008 | 336 | 1006 |
| A | 2 | — | 4 | X | 1 | X |
| A | 2 | Accomet C | 1 | 2 | 1 | 1 |
| A | 2 | Zr:PAA | 3 | 4 | 4 | 5 |
| A | 2 | PAA | 1 | 2 | 1 | 5 |
| B | 2 | — | 4 | X | 1 | X |
| B | 2 | Accomet C | 1 | 2 | 1 | 3 |
| B | 2 | Zr:PAA | 2 | 3 | 1 | 1 |
| B | 2 | PAA | 1 | 2 | 1 | 5 |

X = Test discontinued

Anodic film thicknesses were determined from TEM micrographs. The anodising parameters used and the resulting pretreatment thicknesses are summarised in Table 5 below.

TABLE 5

| Anodising Parameters | | Anodic Film | | Additional Pretreatment | |
|---|---|---|---|---|---|
| Temp. | Time | Thickness (nm) | | Adhesion | Thickness |
| (° C.) | (Secs) | Barrier | Total | Promoter | (nm) |
| 65 | 2 | 40 | 80 | None | None |
| | | 35 | 80 | Accomet C | 25 |
| | | 40 | 80 | 1:1 Zr:PAA | 40 |
| | | 40 | 100 | PAA | — |

EXAMPLE 6

Panels of the same alloys as used in Example 5 were precleaned and then anodised for 3 seconds in phosphoric acid at 65° C. using an anodising current of 3 A. The anodising process time was varied to produce either a 30 nm barrier layer or a 100 nm fully filamented anodic film. Some anodised panels were additionally treated with polyacryclic acid is (PAA) or Henkel poly(hydroxyphenyl) styrene derivative (PHS) solutions at two different spin coating concentrations. The treated panels were painted with a base coat and a clear coat, cured, and exposed to acetic acid salt spray tests (DIN 50021). The experiments are summarised in the following Table 6 and the results given in Table 7. The findings can be summarised:—

1. Phosphoric acid anodised pretreatments gave poor acetic acid salt spray test irrespective of anodic film structure.
2. The acetic acid salt spray test performance of the phosphoric acid anodised pretreatment was significantly improved by subsequent treatment with PAA or PHS solutions. A 2% PAA spin coated application produced the best overall performance and without any failures.

| | | ANODISING PARAMETERS | | | ADDITIONAL | Spin |
|---|---|---|---|---|---|---|
| Expt | ALLOY | Amps | Temp. (° C.) | Time (secs) | PRE-TREATMENT | Coating % Conc. |
| 1 | AA3005 | 3 | 65 | 1.5 | None | |
| 2 | | | | 3 | | |
| 3 | | | | | PAA | 0.5 |
| 4 | | | | | | 2 |
| 5 | | | | | PHS | 0.5 |
| 6 | | | | | | 2 |
| 7 | AA5754 | 3 | 65 | 1.5 | None | |
| 8 | | | | 3 | | |
| 9 | | | | | PAA | 0.5 |
| 10 | | | | | | 2 |
| 11 | | | | | PHS | 0.5 |
| 12 | | | | | | 2 |

TABLE 7

| | Hours exposed to acetic acid salt spray (DIN 50021) | | | | | | | | |
|---|---|---|---|---|---|---|---|---|---|
| | Panel & Scribe | | | Bend | | | Creep | | |
| Expt. | 336 | 504 | 1008 | 336 | 504 | 1008 | 336 | 504 | 1008 |
| 1 | 4 | 4 | 5 | 5 | 5 | 5 | 1 | 1 | 5 |
| 2 | 4 | 4 | 5 | 2 | 2 | 5 | 1 | 1 | 5 |
| 3 | 1 | 1 | 2 | 2 | 2 | 2 | 1 | 1 | 1 |

TABLE 7-continued

| | Hours exposed to acetic acid salt spray (DIN 50021) | | | | | | | | |
|---|---|---|---|---|---|---|---|---|---|
| | Panel & Scribe | | | Bend | | | Creep | | |
| Expt. | 336 | 504 | 1008 | 336 | 504 | 1008 | 336 | 504 | 1008 |
| 4 | 1 | 1 | 2 | 2 | 2 | 2 | 1 | 1 | 1 |
| 5 | 1 | 1 | 2 | 1 | 3 | 3 | 1 | 1 | 1 |
| 6 | 1 | 1 | 2 | 1 | 1 | 2 | 1 | 1 | 1 |
| 7 | 4 | 4 | 5 | 2 | 2 | 5 | 1 | 1 | 5 |
| 8 | 4 | 4 | 4 | 1 | 1 | 1 | 1 | 1 | 5 |
| 9 | 1 | 1 | 3 | 1 | 1 | 1 | 1 | 1 | 1 |
| 10 | 1 | 1 | 1 | 1 | 1 | 1 | 1 | 1 | 1 |
| 11 | 1 | 1 | 1 | 1 | 1 | 5 | 1 | 1 | 3 |
| 12 | 1 | 1 | 1 | 1 | 2 | 4 | 1 | 1 | 3 |

EXAMPLE 7

Panels of AA5754 H42 0.76 mm thick were electrolytically cleaned in phosphoric acid for 3 seconds at 90° C. and were then (in some cases) anodised under various conditions as shown in Table 8 below. The treated panels were spin coated with an adhesion promoter as indicated:

Accomet C (Albright & Wilson, Cr and Si values)
PAA (polyacrylic acid)
PSSA Polystyrene sulphonic acid-co-maleic add
PHS Henkel, poly(hydroxyphenyl)-styrene derivative
Aldoine NR1453N (Henkel, Zr, Ti values plus PHS)

The coated panels were painted (Wuff PVDF-1 2923-40+ Becker PK 16-40) and exposed to acid salt spray according to DIN 50021-ESS. Results are set out in Table 9 below.

TABLE 8

| Anodising Parameters | | | Additional | Spin | Coat | |
|---|---|---|---|---|---|---|
| Amps (kA) | Temp. (° C.) | Time (Secs) | Conc. Treatment | Coating % | Weight (mg/m²) | Test No. |
| 3 | 65 | 3 | Anodised only | | None | 1 |
| | | | PAA Mol. wt 5 K | 2 | 163 | 2 |
| | | | | 2 | 164 | 3 |
| | | | | 5 | 245 | 4 |
| | | | | 10 | 407 | 5 |
| | | | PAA Mol. wt 250 K | 2 | 277 | 6 |
| | | | PHS | 0.5 | | 7 |
| | | | | 2 | | 8 |
| | | | | 5 | | 9 |
| | | | PSSA | 1 | | 10 |
| | | | Accomet C | 5 | | 11 |
| | | | Hydroxquinoline | 1 | | 12 |
| ac sulphuric acid anodised | | | Anodised only | | None | 13 |
| 3 | 60 | 2 | PAA Mol. wt | 2 | 176 | 14 |
| | | | 50 K | 5 | 207 | 15 |

TABLE 9

| | Hours exposed to acetic acid salt spray (DIN50021) | | | | | | | | |
|---|---|---|---|---|---|---|---|---|---|
| Test | Panel & Scribe | | | Bend | | | Creep | | |
| No | 336 | 504 | 840 | 336 | 504 | 840 | 336 | 504 | 840 |
| 1 | 4 | 4 | 5 | 1 | 1 | 2 | 1 | 5 | 5 |
| 2 | 1 | 2 | 4 | 1 | 1 | 2 | 1 | 1 | 1 |
| 3 | 1 | 1 | 1 | 2 | 2 | 2 | 1 | 1 | 1 |
| 4 | 1 | 1 | 1 | 1 | 1 | 1 | 1 | 1 | 1 |
| 5 | 1 | 2 | 3 | 1 | 1 | 1 | 1 | 1 | 1 |
| 6 | 1 | 1 | 2 | 1 | 1 | 1 | 1 | 1 | 1 |

TABLE 9-continued

| Hours exposed to acetic acid salt spray (DIN50021) | | | | | | | | | |
|---|---|---|---|---|---|---|---|---|---|
| Test | Panel & Scribe | | | Bend | | | Creep | | |
| No | 336 | 504 | 840 | 336 | 504 | 840 | 336 | 504 | 840 |
| 7 | 1 | 1 | 1 | 2 | 2 | 2 | 1 | 1 | 1 |
| 8 | 3 | 4 | 5 | 1 | 1 | 2 | 1 | 1 | 5 |
| 9 | 4 | 5 | 5 | 1 | 5 | 5 | 5 | 5 | 5 |
| 10 | 4 | 4 | 5 | 1 | 1 | 2 | 1 | 5 | 5 |
| 11 | 1 | 1 | 1 | 2 | 2 | 2 | 1 | 1 | 1 |
| 12 | 1 | 4 | 4 | 2 | 2 | 2 | 1 | 1 | 5 |
| 13 | 4 | 5 | 5 | 2 | 2 | 3 | 5 | 5 | 5 |
| 14 | 1 | 1 | 1 | 2 | 2 | 2 | 1 | 1 | 1 |
| 15 | 1 | 1 | 2 | 1 | 1 | 1 | 1 | 1 | 1 |

What is claimed is:

1. An aluminium workpiece comprising on a surface thereof: an oxide film that is formed anodically, which film is 10 to 200 nm thick; and a coating on the oxide film, which coating consists essentially of at least one adhesion promoter containing one or more of Cr, Mn, Mo, Si, Ti, Zr and F, optionally containing an organic polymer, wherein the Cr, Mn, Mo, Si, Ti, Zr and F are present in inorganic form, and wherein the adhesion promoter is applied as a no-rinse coating, which is a composition consisting essentially of the adhesion promoter in a volatile vehicle which evaporates leaving a film of the adhesion promoter, or a conversion coating, which reacts chemically with the oxide film to form a film of the adhesion promoter, said workpiece being an aluminium sheet of which at least one surface has the oxide film, the adhesion promoter and a paint layer or an adhesive overlying the adhesion promoter.

2. The aluminium workpiece of claim 1, wherein the adhesion promoter is one containing one or more of Cr, Mn, Mo, Si, Ti and Zr.

3. The aluminium workpiece of claim 1, wherein the organic polymer is selected from at least one of polyacrylic acid and poly(hydroxyphenyl)styrene.

4. The aluminium workpiece of claim 1, wherein the oxide film is a barrier layer.

5. The aluminium workpiece of claim 1, wherein the oxide film is 10–50 nm thick.

6. The aluminium workpiece of claim 1, which is a primed sheet for automotive use.

7. The aluminium workpiece of claim 1, wherein the paint layer is of an electro-conductive paint primer.

8. An aluminium workpiece comprising on a surface thereof: an oxide film that is formed anodically, which film is 10 to 200 nm thick; and a coating on the oxide film, which coating consists essentially of at least one adhesion Promoter containing one or more of Cr, Mn, Mo, Si, Ti, Zr and F, optionally containing an organic Polymer, wherein the Cr, Mn, Mo, Si, Ti, Zr and F are present in inorganic form, wherein the adhesion promoter is applied as a no-rinse coating, which is a composition consisting essentially of the adhesion promoter in a volatile vehicle which evaporates leaving a film of the adhesion promoter, or a conversion coating, which reacts chemically with the oxide film to form a film of the adhesion promoter, and wherein the adhesion promoter coating is present at a weight of 2–100 $mg/m^2$.

9. The aluminium workpiece of claim 8, wherein the adhesion promoter is one containing one or more of Cr, Mn, Mo, Si, Ti and Zr.

10. The aluminium workpiece of claim 8, wherein the organic polymer is selected from at least one of polyacrylic acid and poly(hydroxyphenyl)styrene.

11. The aluminium workpiece of claim 8, wherein the oxide film is a barrier layer.

12. The aluminium workpiece of claim 8, which is an aluminum sheet of which at least one surface has the oxide film, the adhesion promoter and a paint layer or an adhesive overlying the adhesion promoter.

13. The aluminium workpiece of claim 8, wherein the oxide film is 10–50 nm thick.

14. The aluminium workpiece of claim 8, which is a primed sheet for automotive use.

15. A method of treating an aluminium workpiece, which method comprises precleaning a surface of the workpiece, anodising the workpiece so as to form an anodic oxide film 10 to 200 nm thick on the surface and applying to the anodic oxide film a coating which consists essentially of at least one adhesion promoter containing one or more of Cr, Mn, Mo, Si, Ti, Zr and F, optionally containing an organic polymer, wherein the Cr, Mn, Mo, Si, Ti, Zr and F are present in inorganic form, and wherein the adhesion promoter is applied to the anodic oxide film in the form of a no-rinse coating, which is a composition consisting essentially of the adhesion promoter in a volatile vehicle which evaporates leaving a film of the adhesion promoter, or a conversion coating, which reacts chemically with the oxide film to form a film of the adhesion promoter; wherein the aluminium workpiece is an aluminium sheet, the precleaned surface of the sheet is continuously anodised to form an anodic film on the surface, and a paint layer or adhesive is applied over the adhesion promoter coating.

16. The method of claim 15, wherein the anodic oxide film is a barrier film.

* * * * *